(12) United States Patent
Beatty

(10) Patent No.: US 6,386,408 B1
(45) Date of Patent: May 14, 2002

(54) TRANSPARENT SECUREMENT CLIP FOR A VEHICLE VISOR

(75) Inventor: James Beatty, Antioch, IL (US)

(73) Assignee: Clear Clip, Inc., Antioch, IL (US)

( * ) Notice: Subject to any disclaimer, the term of this patent is extended or adjusted under 35 U.S.C. 154(b) by 0 days.

(21) Appl. No.: 09/617,553

(22) Filed: Jul. 17, 2000

(51) Int. Cl.$^7$ ................................................ B60R 7/05
(52) U.S. Cl. .................. 224/312; 224/277; 224/670; 24/3.11; 24/509; D12/417
(58) Field of Search ................... 224/669, 670, 224/277, 312; 24/509, 510, 507, 3.11; 40/593; D12/417

(56) References Cited

U.S. PATENT DOCUMENTS

| | | | | |
|---|---|---|---|---|
| 63,759 | A | * | 4/1867 | Smith |
| 150,439 | A | * | 5/1874 | Smith |
| 2,048,105 | A | | 7/1936 | Cobbs |
| 2,306,174 | A | * | 12/1942 | Mallory |
| 2,408,145 | A | * | 9/1946 | Johnson |
| 2,517,337 | A | | 8/1950 | Nodle |
| 2,537,703 | A | * | 1/1951 | Randa |
| 2,721,409 | A | | 10/1955 | Bland |
| 2,803,902 | A | * | 8/1957 | Shedd |
| 2,848,116 | A | | 8/1958 | Odom |
| 3,545,805 | A | | 12/1970 | Wilson |
| 4,732,107 | A | * | 3/1988 | Jacobsen |
| 5,022,124 | A | | 6/1991 | Yiin |
| 5,052,081 | A | * | 10/1991 | Fuehrer |
| 5,195,668 | A | | 3/1993 | Kunes et al. |
| 5,306,065 | A | | 4/1994 | Ades |
| 5,330,085 | A | | 7/1994 | Horensky et al. |
| 5,379,929 | A | | 1/1995 | Eskandry |
| 5,402,924 | A | | 4/1995 | Gilson |
| 5,538,311 | A | | 7/1996 | Fusco et al. |
| 5,678,880 | A | | 10/1997 | Keller |
| 5,791,019 | A | * | 8/1998 | Jeong |

* cited by examiner

Primary Examiner—Gregory M. Vidovich
(74) Attorney, Agent, or Firm—Gary R. Gillen; Wildman, Harrold, Allen & Dixon

(57) ABSTRACT

A seducement clip is provided for releasable attachment to a visor of a vehicle. The seducement clip has a pivotally moveable arm, a base member in which at least a portion of the base member is formed of a transparent material and a spring biased support apparatus disposed between the movable arm and the base member.

11 Claims, 1 Drawing Sheet

TRANSPARENT SECUREMENT CLIP FOR A VEHICLE VISOR

BACKGROUND OF THE INVENTION

The present invention relates generally to automotive visor attachment devices and more particularly to clip devices which are releasably attachable to a visor of a vehicle.

Various devices have been used for containing or holding items proximate to a vehicle visor located at passenger or driver sides of the interior of the vehicle. For instance certain pouch like devices may be employed for containing keys, sunglasses, miscellaneous papers and the like. However, many of such pouch or wallet-like devices are complex and are often positioned on the reverse side of the visor adjacent to and abutting against the interior hood of the vehicle rendering it difficult to see and remove the items contained therein. Various clip and strap-like devices have also been used for holding items against automotive sun visors. Unfortunately, many of these devices also tend to be complex and moreover, are made of colored opaque materials which prevent viewing of the items (such as photographs, maps, written directions, notes, etc.) held underneath. Additionally, certain clip type devices have non-linear seducement members with one or more bent projections further limiting visibility of secured materials. Thus, there is a need in the art for an easy to use, inexpensive visor attachment device which permits visibility of the items held against the visor of a vehicle.

SUMMARY OF THE INVENTION

The above problems are solved and a technical advance is achieved in the art by implementing a retainment clip having a transparent body which enables items to be completely visible when being held by the clip against a vehicle visor.

A seducement clip is provided for releasable attachment to a visor of a vehicle. The seducement clip has a pivotally moveable arm, a base member having at least a portion of the base member being formed of a transparent material for viewing of items through the transparent portion of the base member and a spring biased support apparatus for holding a portion of the pivotally movable arm at a distance from the base member. The spring biased support apparatus enables resilient pivotal movement of the pivotally movable arm.

BRIEF DESCRIPTION OF THE DRAWING

The advantageous features of the invention will be explained in greater detail and others will be made apparent from the detailed description which is given with reference to the several figures of the drawing, in which.

DETAILED DESCRIPTION

Figure 1:
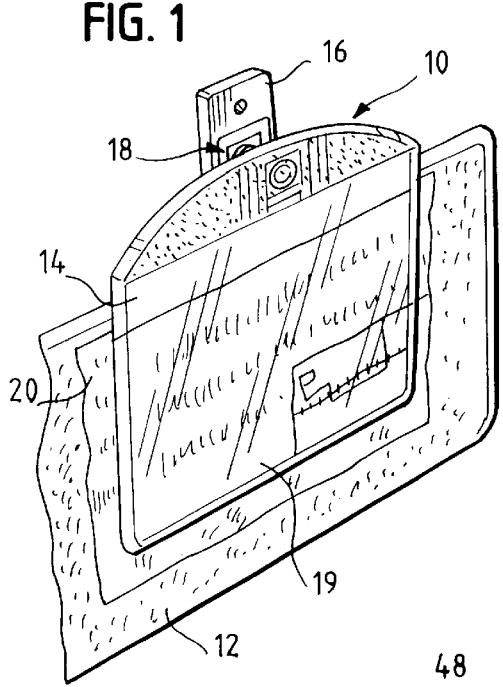
FIG. 1 is a perspective view of the seducement clip which is attached to a vehicle visor.
Figure 5:
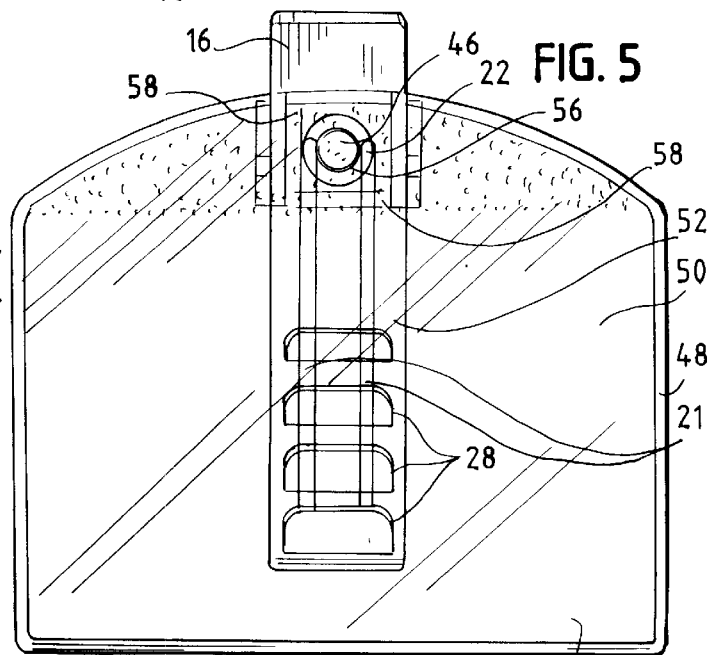
FIG. 5 is a back view of the seducement clip.

Referring to FIG. 1, seducement clip 10 is shown releasably attached to visor 12 of a vehicle such as an automobile, truck, airplane and the like. The seducement clip 10 has a base member 14 in which a portion of the base member is formed of a transparent material to enable viewing of items held underneath the transparent portion (or viewing portion) of the base member. In alternative arrangements, the entire body of the base member 14 may be formed of the clear transparent material. A pivotally movable arm 16 of the seducement clip 10 is preferably formed of a plastic material which may selectively be either opaque or transparent. In alternative arrangements the pivotally movable arm 16 may alternatively be made of metal, wood, glass or other suitable material. As seen in FIGS. 1 and 5, the base member 14 has a viewing area 19 covering a majority (preferably approximately 80%) of the total area of the base member with the viewing area being formed of the transparent clear plastic material. A spring biased support apparatus 18 is disposed between and connects together the pivotally movable arm 16 and the base member 14. The transparent material of the base 14, and in particular in the viewing area of the base, is preferably a clear plastic to enable viewing of printed items 20 (such as maps, directions, notes, pictures and the like) which are held against the visor 12 by clip 10. By forming the base member 14 of clear plastic (such as an acrylic plastic), printed material held by the clip 10 can be seen through the base when the clip is attached on opposing sides of the visor 12. The clear plastic clip 10 is used in operation by pivotally moving arm 16 to an open position. The clip 10 is placed over the visor 12 upon release of the pivotally movable arm 16. As will be discussed further herein, spring tension enables automatic return of the arm 16 to close the clip 10 onto the visor 12. Printed items 20 may then be positioned between the clear plastic clip 10 and the visor 12 and be viewed through the body of the base member 14 of the clip.

Figures 2, 3:
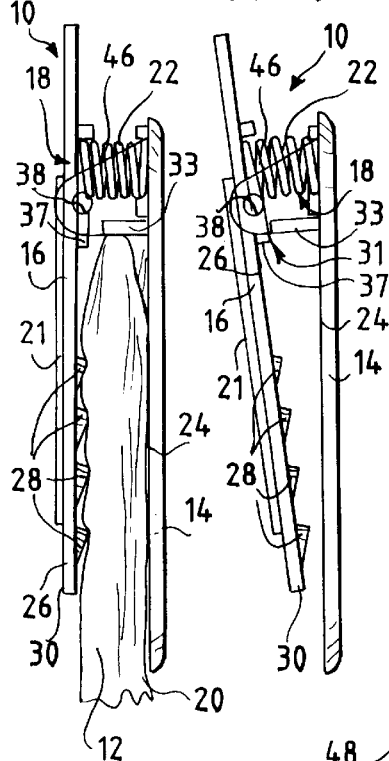
FIG. 2 is a side view of the seducement clip as attached to a vehicle visor.
FIG. 3 is a side view of the seducement clip in a stopped position.

Referring now to FIG. 2, the seducement clip 10 is shown holding printed material 20 against the visor 12 with the base 14 and pivotally movable arm 16 engaging the visor. FIG. 3 shows the seducement clip 10 removed from engagement with the visor having the pivotally movable arm 16 automatically returned to a stopped position. The bottom surface 26 of the pivotally movable arm 16, has a plurality of ribs 28 positioned proximate a distal end 30 from the spring biased support apparatus 18 to provide enhanced frictional engagement of the arm to the visor 12 and/or the printed items 20. The ribs 28 are generally triangularly shaped and are positioned at the bottom surface 26 of the pivotally movable arm proximate the base member 14. As seen in FIGS. 1–3, the pivotally movable arm 16 has an elongate body which is linear and preferably substantially the entire body of the movable arm 16 is formed of plastic material.

Figure 7:
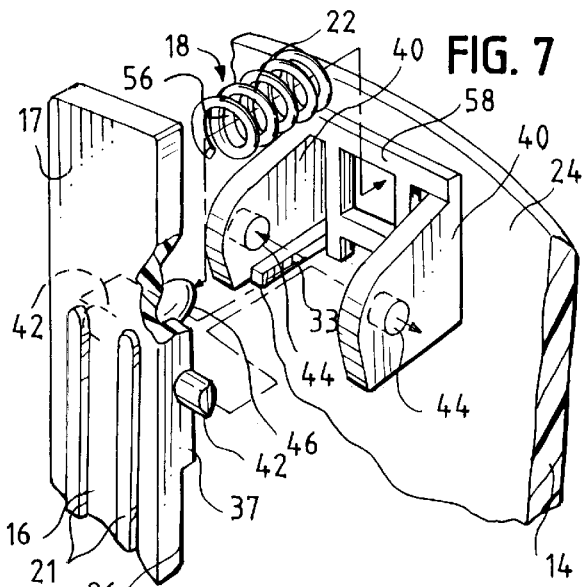
FIG. 7 is an exploded view of the spring biased support apparatus of the seducement clip.

Referring now to FIGS. 2, 3 and 7, spring biased support apparatus 18 is shown to have a spring member 22 disposed between the pivotally movable arm 16 and the base member 14. The spring member 22 is preferably a coiled spring which provides automatic return of the movable arm 16 from an opened position, FIG. 2, to a closed or stopped position, FIG. 3. As seen in FIGS. 2 and 3, the spring biased support apparatus 18 holds a portion 38 of the movable arm 16 at a distance from the base member 14 with the spring member 22 of the spring biased support apparatus enabling resilient pivotal movement of the pivotally movable arm. The coiled spring 22 engages a top surface 24 of the base member 14 and the bottom surface 26 of the pivotally movable arm 16. As seen in FIGS. 1–3, 5 and 7, the top surface 24 of the base 14 faces the pivotally movable arm 16 and the bottom surface 26 of the movable arm is the surface which faces the base member. Additionally, two reinforcement bars 21 are affixed to and extend from the top or outward portion 17 of the pivotally movable arm 16. The elongate reinforcement bars 21 are preferably parallel to one another and extend along a portion of the length of the top surface 17 of the pivotally movable arm 16. The reinforcement bars 21 provide stability to the plastic pivotally movable arm 16 to reduce alteration of the arm in hot weather conditions when secured to the visor of a vehicle.

Figure 4:
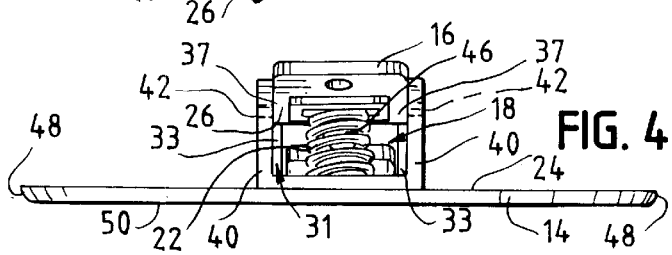
FIG. 4 is a top view of the seducement clip.

As seen in FIGS. 5 and 7, the pivotally movable arm 16 has an extension peg 46 extending from its bottom surface 26. The extension peg 46 is positioned within and surrounded by the coiled spring 22. The extension peg 46 is generally round in shape and has a diameter which gradually increases as the extension peg tapers toward the bottom surface 26 of the pivotally movable arm 16. As seen in FIGS. 4 and 5, the extension peg 46 is substantially flush with a portion of an interior surface 56 of the coiled spring 22 proximate the bottom surface 26 of the pivotally movable arm 16 to limit lateral movement of the coiled spring. As seen in FIG. 7, a retainment wall 58 proximate the top surface 24 of the base 14 is positioned about the coiled spring 22 to limit lateral movement of the coiled spring proximate the top surface of the base member.

As further seen in FIGS. 4 and 7, the spring biased support apparatus 18 includes a pair of parallel spaced support posts 40 secured to and extending from the top surface 24 of the base member 14. A pair of lateral extension members 42 are secured to the pivotally movable arm 16 which are held by the support posts 40 at a distance from the base 14. The lateral extension members 42 laterally extend from the pivotally movable arm 16 and are positioned into a pair of corresponding bores 44 through the support posts 40. As seen in FIGS. 3, 4 and 7, a stopping unit 31 extends transverse and substantially perpendicularly from the top surface 24 of the base member 14 to engage the bottom surface 26 of the movable arm 16 when the clip is in the stopped position, FIG. 3, in order to hold the distal end 30 in a slightly elevated position relative to the top surface 24 of the base. The stopping unit 31 preferably includes a pair of stopping members 33 which are connected to and extend from the top surface 24 of base member 14 to abut against a pair of corresponding pads 37, FIG. 4, extending from the bottom surface 26 of the arm 16 which are positioned on opposite sides of the extension peg 46 to prevent the distal end 30, FIG. 3, of the arm 16 from contacting the base member 14 when in the stopped or closed position. Establishing a space between the distal end 30 of the arm 16 and base member 14 when in the stopped position allows the clip 10 to be easily slid into place on a vehicle visor.

Figure 6:
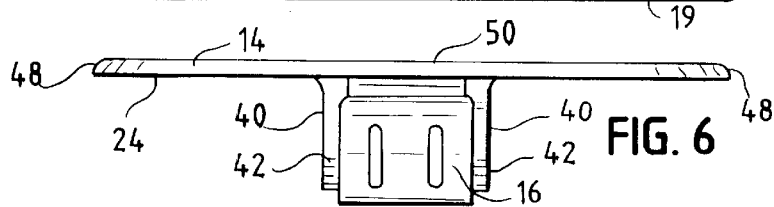
FIG. 6 is a bottom view of the seducement clip.

Referring now to FIGS. 4–6, the base member 16 has rounded edges 48 about the perimeter of the base member. The base member 16 is substantially entirely flat and has a surface area 50 which is substantially greater than the surface area 52 of the pivotally movable arm 14. As seen in FIG. 5, the surface area 50 of the base member 14 is preferably more than three (3) times greater than the surface area 52 of the pivotally movable arm 14.

While the invention has been particularly shown and described with reference to particular embodiments, it will be understood by those skilled in the art that various changes in form and details may be made therein without departing from the spirit and scope of the invention as set forth in the appended claims.

What is claimed is:

1. A seducement clip for releasable attachment to a visor of a vehicle comprising:

a pivotally movable arm formed of plastic material in which the pivotally removable arm has an elongate body which is linear;

a base member having at least a portion of the base member formed of plastic transparent material, the base member has a viewing area covering a majority of the total area of the base member in which the viewing area of the base member is formed of the transparent material and in which the base member is substantially entirely flat and has a surface area which is substantially greater than a surface of the pivotally movable arm;

a spring biased support apparatus for holding a portion of the pivotally movable arm at a distance from the base member, the spring biased support apparatus enables resilient pivotal movement of the pivotally movable arm and in which the spring biased support apparatus comprises a coiled spring disposed between the pivotally movable arm and the base member which engages a top surface of the base member and a bottom surface of the pivotally movable arm to provide automatic return of the movable arm from an open position to a stopped position; and said pivotally movable arm includes an extension peg extending from the bottom surface of the pivotally movable arm and in which the extension peg is positioned within and surrounded by the coiled spring and the extension peg is generally round in shape and has a diameter which gradually increases as the extension peg tapers toward the bottom surface of the pivotally movable arm.

2. The seducement clip of claim 1 including a stopping unit extending transverse from the top surface of the base member for engagement with the bottom surface of the pivotally movable arm to prevent the arm from engaging the base when in the stopped position.

3. The seducement clip of claim 2 in which the stopping unit includes at least two stopping members which substantially perpendicularly extend from the base member to abut against a pair of corresponding pads positioned on opposite sides of the extension peg and which extend from the bottom surface of the pivotally movable arm.

4. The seducement clip of claim 1 in which the extension peg is substantially flush with a portion of an interior surface of the coiled spring proximate the bottom surface of the pivotally movable arm to limit lateral movement of the coiled spring.

5. The seducement clip of claim 4 including a retainment wall positioned about the coiled spring and proximate the top surface of the base member to limit lateral movement of the coiled spring proximate the top surface of the base member.

6. The seducement clip of claim 1 in which the spring biased support apparatus includes a pair of parallel spaced support posts secured to and extending from the top surface of the base member and including a pair of lateral extension members secured to the pivotally movable arm which are held by the support posts at a distance spaced from the base member.

7. The seducement clip at claim 6 in which the lateral extension members laterally extend from the pivotally movable arm and are positioned into a pair of corresponding bores through the support posts.

8. The seducement clip of claim 7 in which the base member has rounded edges about the perimeter of the base member.

9. The seducement clip of claim 1 including at least one generally triangularly shaped rib positioned at the bottom surface of the pivotally movable arm proximate the base member to provide enhanced frictional engagement with the visor.

10. The seducement clip of claim 9 including at least one elongate reinforcement bar affixed to and extending from a top surface of the pivotally movable arm.

11. A seducement clip for releasable attachment to a visor of a vehicle comprising:

a pivotally movable arm having an elongate body;

a base member formed of plastic transparent material in which the base member is substantially entirely flat and has a surface area more than three (3) times greater than a surface area of the pivotally movable arm;

a spring biased support apparatus having a coiled spring disposed between the pivotally movable arm and the base member in which the coiled spring connects with a top surface of the base member and a bottom surface of the pivotally movable arm and in which the spring biased support apparatus includes a pair of parallel spaced support posts secured to and extending from the top surface of the base member, a pair of lateral extension members are secured to the pivotally movable arm and are held by the support posts at a distance spaced from the base member, said lateral extension members laterally extend from the pivotally movable arm and are positioned into a pair of corresponding bores through the support posts; and an extension peg extending from the bottom surface of the pivotally movable arm, said extension peg is positioned within and surrounded by the coiled spring, said extension peg is generally round in shape and has a diameter which gradually increases as the peg tapers toward the bottom surface of the pivotally movable arm such that the extension peg is substantially flush with a portion of an interior surface of the coiled spring to limit lateral and movement of the coiled spring.

\* \* \* \* \*

UNITED STATES PATENT AND TRADEMARK OFFICE
CERTIFICATE OF CORRECTION

PATENT NO. : 6,386,408 B1
DATED : May 14, 2002
INVENTOR(S) : James Beatty

It is certified that error appears in the above-identified patent and that said Letters Patent is hereby corrected as shown below:

Delete the word "seducement" and replace it with the word -- securement -- in each occasion it appears throughout the entire patent.

Signed and Sealed this

Twenty-fourth Day of December, 2002

JAMES E. ROGAN
*Director of the United States Patent and Trademark Office*